US012806106B1

(12) United States Patent
Coleman, III

(10) Patent No.: US 12,806,106 B1
(45) Date of Patent: Nov. 24, 2026

(54) POST-MANDBILE CLAMP

(71) Applicant: Christopher Coleman, III, Hastings, FL (US)

(72) Inventor: Christopher Coleman, III, Hastings, FL (US)

( * ) Notice: Subject to any disclaimer, the term of this patent is extended or adjusted under 35 U.S.C. 154(b) by 14 days.

(21) Appl. No.: 19/634,521

(22) Filed: Mar. 31, 2026

(51) Int. Cl.
*A61G 99/00* (2006.01)
*A01N 1/00* (2006.01)
*A61G 17/04* (2006.01)

(52) U.S. Cl.
CPC ............... *A61G 99/00* (2013.01); *A01N 1/00* (2013.01); *A61G 17/044* (2016.11)

(58) Field of Classification Search
CPC ........ A61G 99/00; A61G 17/044; A01N 1/00; A61C 7/36; A61F 5/3707
See application file for complete search history.

(56) References Cited

U.S. PATENT DOCUMENTS 1,870,566 A * 8/1932 Heitritter ................ A61C 7/00 27/21.1
2,172,252 A * 9/1939 Stirling .................... A01N 1/00 27/21.1
2,968,868 A * 1/1961 Page ........................ A61C 9/00 433/73
5,605,456 A * 2/1997 Young .................... A61C 11/02 433/54
6,260,551 B1 * 7/2001 Sargent .................... A01N 1/00 27/21.1
8,062,032 B2 * 11/2011 Bulloch .................. A61C 7/22 433/18
2005/0241650 A1 * 11/2005 Lombardi ................ A61C 7/36 128/859
2011/0094522 A1 * 4/2011 Weisflog .................. A61C 7/36 128/861
2015/0224010 A1 * 8/2015 Laccitiello ........... A61G 17/032 27/18
2015/0282900 A1 * 10/2015 Lee .......................... A61C 7/08 433/19
2020/0245612 A1 * 8/2020 Coleman .................. A01N 1/00
2022/0347035 A1 * 11/2022 Coleman .................. A01N 1/00

* cited by examiner

*Primary Examiner* — William L Miller
(74) *Attorney, Agent, or Firm* — Lawrence J. Gibney

(57) ABSTRACT

The positioning of a post-mandible clamp to ensure that the person's mouth remains shut during a funeral service is desired. The post-mandible clamp is placed over both the upper gum and teeth structure and the bottom gum and teeth structure. Once the post-mandible clamp is in place the mouth is gently closed and remains closed during the funeral service. The device is comprised of one piece with two openings on either end that allow the device to be placed over the teeth and gum structure.

2 Claims, 3 Drawing Sheets

POST-MANDBILE CLAMP

FIELD OF THE INVENTION

This device teaches a device to clamp the jaw together for presentation in a funeral setting. It is customary, whenever someone passes away, to maintain the integrity of the body and to make an appropriate appearance for the family and loved ones of the deceased. The jaw and mouth of the deceased are deliberately closed for the service. Additionally, there should be respect for the body and the desire to minimize mutilation of the body around the mouth area. This device, which consists of two embodiments, is device that will ensure that the mandible and the maxilla positions (lower and upper jaw bones) close together and shield the device from the family members and loved ones of the deceased.

PRIOR ART

There are other prior art references that discuss devices that hold the jaw open or closed. Most of the prior art discuss patents that are in the dental field and a representative example of this can be found at Young, U.S. Pat. No. 5,605,456, which is a dental articulator. This device has a different function and structure than the current application. Another reference that also pertains to the dental field can be found at Page, U.S. Pat. No. 2,968,868 is a mandible clamp but this clamp has a completely different structure. Other references include Heitritter, U.S. Pat. No. 1,870,566 and Moore, U.S. Pat. No. 2,172,252

BRIEF SUMMARY OF THE INVENTION

Whenever a person passes away, the body should be presented to the loved ones with a dignified presentation. This means that the mouth of the deceased is shut. In the prior art a gun and the use of wires were used to close the person's mouth. Another method that was found in the prior art used string through the nasal passages to clamp the jaw bones together. Neither of the prior art references expose the attachment method to the family, but both methods involve some mutilation of the body.

This device has two embodiments and can be used if the person dies without teeth or with teeth. Both embodiments have similar shapes with a slightly different design on the interior surface of the device. Although the embodiments are similar the goal of each embodiment is the same: to secure the jaw bones together to make sure that the jaw bones stay shut for presentation of the deceased.

The device is a pair or "U" shaped structures on the top of the device and the bottom of the device, which is a single piece. The top "U" structure will surround the upper teeth (person with teeth) or the gums (person without teeth) and the bottom "U" structure will surround the lower teeth (person with teeth) or the gums (person without teeth). After the device is installed on the upper teeth or gums, the device is inserted over the lower teeth or gums and the funeral employee will gently close the person's mouth. The installed device will ensure that the person's mouth remains shut during the viewing or service.

The front surface of the respective sections of this device will be curved to match the curvature of the person's mouth to hide the fact that this device is keeping the jaw bones shut. The back surface of both sections are flat and are installed on the back surface of the person's gums or teeth.

Within the interior surface of the respective "U" sections (top and bottom) are a plurality of wedges that will contact the gum surface to ensure that the device remains in place. On the first or front surface of the interior of the upper and lower "U" sections are a pair of wedges that will be placed high enough on the interior of the device to contact the gum surface of the person. On the top section of the device a pair of wedges will be spaced apart on the interior surface on the back surface of the respective sections; one will be near the top of the interior surface and the other near the bottom of the interior surface; these will allow additional areas where the device can contact the gum or teeth surfaces of the deceased.

On the second embodiment the wedges that are placed on the interior surface of the back surface are removed. The wedges near the top of the respective "U" sections will remain to secure the device to the gums of the person.

Regardless of which embodiment is used, the device will not mutilate the body of the deceased but still ensure that the jaw of the person remains shut during the service.

NUMBERING REFERENCES

Figure 1:
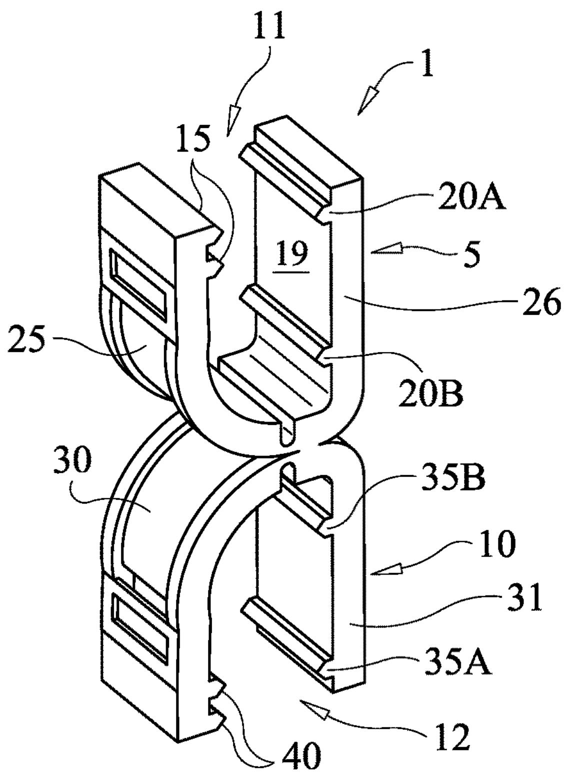
FIG. 1 is a perspective view of the first embodiment.

1 Device
5 Top Section
10 Bottom Section
11 Opening of top section
12 Opening of bottom section
15 Pair of Front Top Section Wedges
18 Interior surface of the front surface of the upper section
19 Interior surface of the back surface of the upper section
20A Upper wedge on the interior back surface of the top section
20B Lower wedge on the interior back surface of the top section
21 Interior front surface of the bottom section
22 Interior back surface of the bottom section
25 Front surface of the top section
26 Back surface of the top section
30 Front surface of the bottom section
31 Back surface of the bottom section
35A Upper wedge on the interior back surface of the bottom section
35B Lower wedge on the interior back surface of the bottom section
40 Pair of front bottom section wedges

DETAILED DESCRIPTION OF THE EMBODIMENTS

Figure 2:
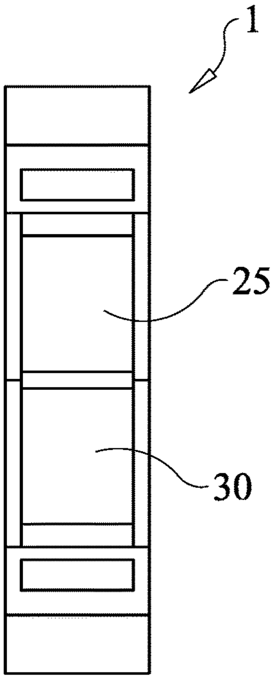
FIG. 2 is a front view of the first embodiment.
Figure 3:
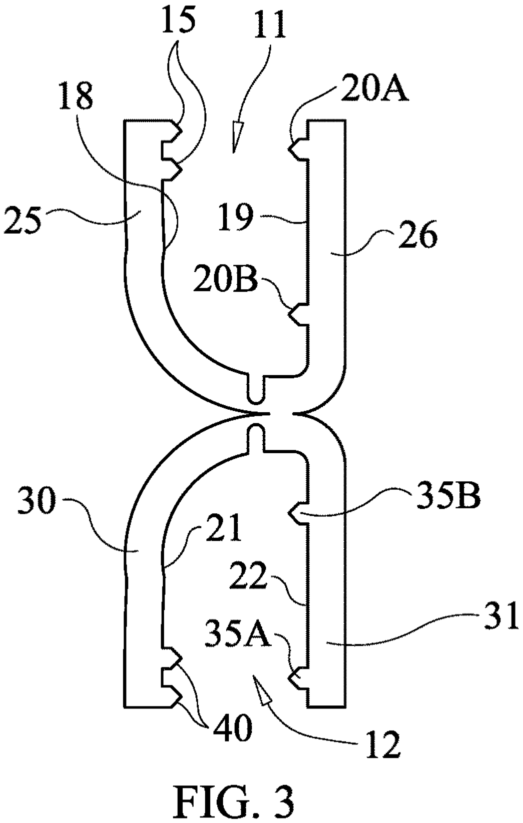
FIG. 3 is a side view of the first embodiment.
Figure 4:
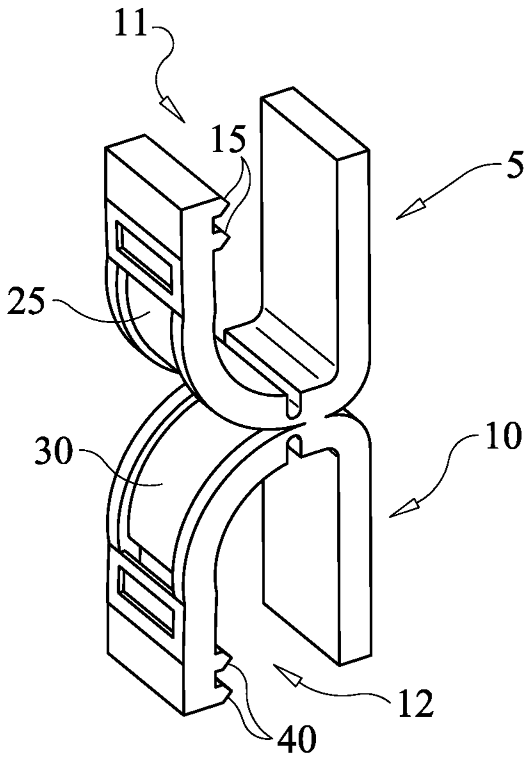
FIG. 4 is a perspective view of the second embodiment.
Figure 5:
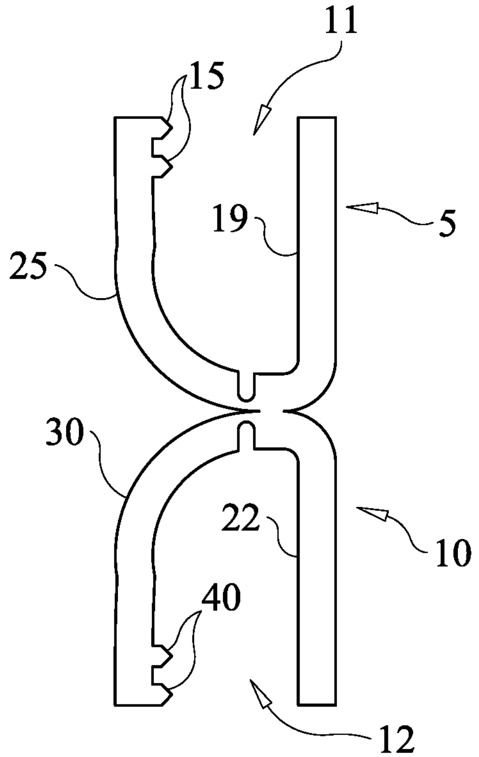
FIG. 5 is a side view of the second embodiment.

Two separate embodiments are taught in this application. The first of the embodiments is depicted in FIGS. 1-3 and the second embodiment is depicted in FIGS. 4-5. Both embodiments can be used with people who pass away with or without teeth and both embodiments will remain with the body.

Figure 6:
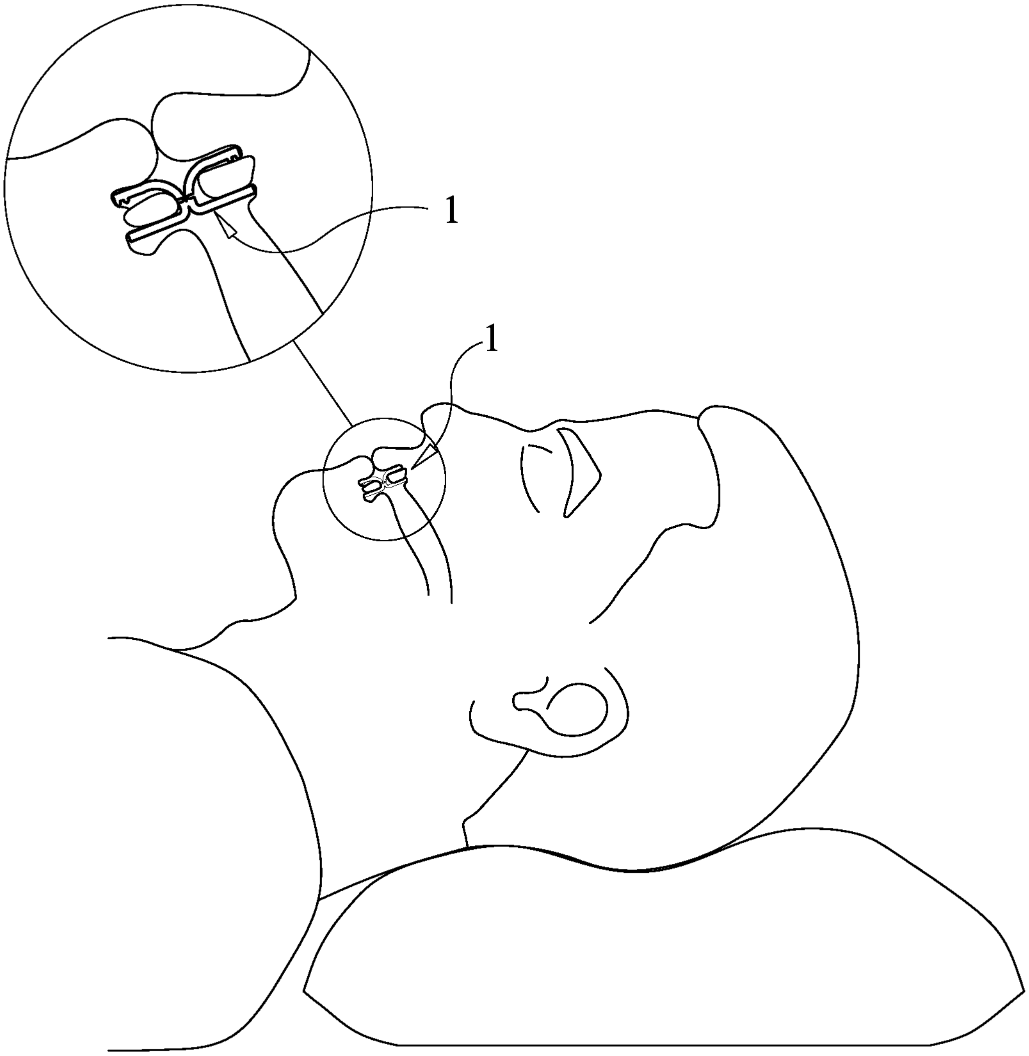
FIG. 6 is an in-use view of the device that is installed in the person's mouth.

This device 1 when it has been installed on the person is covered by the person's lips and mouth such as depicted in FIG. 6 so that it is not seen by family members and loved ones during the funeral service. The device 1 is comprised of two identical portions: a top section 5 and a bottom section 10; the sections are joined together and are one piece. The sections are not intended to be separated. The device 1 is curved on both the front surface of the top section 25 and the front surface of the bottom section 30 to reflect the general contours of the human face.

When the device 1 is installed, this device will ensure that the person's mouth will remain closed during the viewing of the body. Because the anatomy of a human varies from person to person, the device will be offered in large, medium and small sizes.

First Embodiment

The first embodiment is a pair of "U" shaped portions, a top section 5 and a bottom section 10 which are joined together such as depicted in FIG. 1. The top and bottom sections of the respective "U" sections will be open in the center of the "U" and represented by numbers 11 (top section opening) and 12 (bottom section opening). The openings 11, 12 are sized to fit over the gum or teeth structure of the person and have sufficient depth to enable the openings 11, 12 to be deep enough to fit over the person's teeth or gums. The person's gum or teeth will be inserted into the openings of the respective top and bottom sections. A flat back surface 26 on the upper portion 5 and a flat back surface 31 on the lower portion 10 are provided. The flat surfaces 26, 31 will be inserted into the person's mouth first and the device will be positioned with the flat surface in the interior of the person's mouth.

The curved front surface 25 of the top section 5 and the curved front surface 30 of the bottom section 10 will be installed on the front surface of the person's gum or teeth and will face outward. The curve provides a natural look to the device after the device is installed to effectively disguise the presence of the device once it is installed in the person's mouth.

The top section 5 will be comprised of a flat back surface 26 and a curved front surface on the top section with the opening 11 formed by the "U". Within the opening 11 of the top section are a pair of front top section wedges 15 that are placed on the front interior surface 18 of the top section 5 of the device; this pair of front top section wedges are placed proximate to the top of the "U" opening to allow the device to contact the person's gum structure at two points on the person's upper gum. This pair of front top section wedges 15 will contact the surface of the person's upper gum structure and will hold the device in place. A pair of wedges 20A, 20B are placed on the interior back surface 19 of the top section 5 of the device. This pair of wedges 20A and 20B will allow the device to contact the back surface of the upper teeth or gum structure of the person and secure the device to the person.

The bottom section 10 will be comprised of a flat back surface 31 and a curved front surface 30 with an opening 12 formed by the "U" such as depicted in FIG. 3. Within the opening of the bottom section are a front pair of wedges 40, that are placed on the front interior surface 21 of the bottom section of the device; this pair of bottom section front pair of wedges 40 are placed proximate to the top of the opening 12 to ensure that the device contacts the person's gum structure on the lower jaw. This pair of front bottom section wedges 40 will contact the surface of the person's lower gum structure on the bottom of the person's mouth and will hold the device in place. A pair of wedges 35A, 35B that are spaced apart are placed on the interior surface 22 on the back surface of the bottom section 31 of the device. This pair of wedges 35A and 35B will contact the lower teeth or gum structure of the person and secure the device to the person.

Second Embodiment

The second embodiment teaches the first embodiment in all respects except that the wedges on the interior of the top section and bottom section are removed. In this embodiment the respective interior surfaces of the top and bottom sections will be flat such as depicted in FIGS. 4 and 5.

Regardless of which embodiment is used, the device is installed by inserting the opening 11 of the top section 5 over the person's front teeth or gum and the opening 12 of lower section over the person's lower teeth or gums. Once the device is installed over the person's teeth or gums the person's jaw is gently closed.

The inventor claims:

1. A post-mandible clamp, which is comprised of:
a top section,
wherein the top section has a first end and a second end,
wherein an opening is provided at the first end of the top section,
wherein the opening at the first end of the top section has a width to fit over the gum structure of a human,
wherein a back surface of the top section is flat,
wherein a front surface of the top section is curved,
a bottom section,
wherein the bottom section has a first end and a second end;
wherein an opening is provided at the first end of the bottom section,
wherein the opening at the first end of the bottom section has a width to fit over the gum structure of a human,
wherein the second end of the top section is connected to the second end of the bottom section,
said top section and said bottom section are in vertical alignment with each other,
a pair of wedges on the interior of the front surface of the top section,
a pair of wedges on the interior of a front surface of the bottom section,
wherein the pair of wedges on the interior of the front surface of the top portion are proximate to a top surface adjacent to the opening of the top portion,
wherein the pair of wedges on the interior of the front surface of the bottom section are proximate to a top surface adjacent to the opening of the bottom section,
an upper wedge on the interior of a back surface of the opening of the top section,
a lower wedge on the interior of the back surface of the opening of the top section,
an upper wedge on the interior of a back surface of the opening of the bottom section,
a lower wedge on the interior of the back surface of the opening of the bottom section.

2. A post-mandible clamp, which is comprised of:
a top section,
wherein the top section has a first end and a second end,
wherein an opening is provided at the first end of the top section,
wherein the opening at the first end of the top section has a width to fit over the gum structure of a human,
wherein a back surface of the top section is flat, wherein a front surface of the top section is curved, a bottom section, wherein the bottom section has a first end and a second end, wherein an opening is provided at the first end of the bottom section, wherein the opening at the first end of the bottom section has a width to fit over the gum structure of a human, wherein the second end of the top section is connected to the second end of the bottom section, said top section and bottom section are in vertical alignment with each other, wherein a back surface of the bottom section is flat, wherein a front surface of the bottom section is curved, a pair of wedges on the interior of the front surface of the top section, a pair of wedges on the interior of the front surface of the bottom section, wherein the pair of wedges on the interior of the front surface of the top portion are proximate to a top surface adjacent to the opening of the top portion, wherein the pair of wedges on the interior of the front surface of the bottom section are proximate to a top surface adjacent to the opening of the bottom section.

* * * * *